US010834658B2

(12) United States Patent
Kumabe (10) Patent No.: US 10,834,658 B2
(45) Date of Patent: Nov. 10, 2020

(54) WIRELESS COMMUNICATION DEVICE FOR VEHICLE (71) Applicant: DENSO CORPORATION, Aichi-pref. (JP)

(72) Inventor: Seigou Kumabe, Kariya (JP)

(73) Assignee: DENSO CORPORATION, Kariya (JP)

(*) Notice: Subject to any disclaimer, the term of this patent is extended or adjusted under 35 U.S.C. 154(b) by 241 days.

(21) Appl. No.: 15/735,384

(22) PCT Filed: May 30, 2016

(86) PCT No.: PCT/JP2016/002611
§ 371 (c)(1),
(2) Date: Dec. 11, 2017

(87) PCT Pub. No.: WO2017/006508
PCT Pub. Date: Jan. 12, 2017

(65) Prior Publication Data
US 2018/0184353 A1 Jun. 28, 2018

(30) Foreign Application Priority Data
Jul. 9, 2015 (JP) ................. 2015-138056

(51) Int. Cl.
H04W 40/12 (2009.01)
H04W 40/02 (2009.01)
(Continued)

(52) U.S. Cl.
CPC ............ H04W 40/12 (2013.01); H04W 4/46 (2018.02); H04W 24/08 (2013.01); H04W 40/02 (2013.01);
(Continued)

(58) Field of Classification Search
CPC ....... H04W 40/12; H04W 4/46; H04W 24/08; H04W 40/02; H04W 48/20; H04W 84/005; H04W 84/18
See application file for complete search history.

(56) References Cited

U.S. PATENT DOCUMENTS 8,884,781 B2 * 11/2014 Yuse ................. G01C 21/3691
340/902
9,198,145 B2 * 11/2015 Nakata ................ H04W 56/001
(Continued)

FOREIGN PATENT DOCUMENTS

JP 2005176066 A 6/2005
JP 2007129542 A 5/2007
(Continued)

Primary Examiner — Ian N Moore
Assistant Examiner — Latresa A McCallum
(74) Attorney, Agent, or Firm — Harness, Dickey & Pierce. P.L.C.

(57) ABSTRACT

A wireless communication device having a wireless receiver and a wireless transmitter includes a control circuit having a processor. The control circuit successively calculates a metrics value indicating a communication success rate with a different wireless communication device based on an electric wave received from the different wireless communication device. The control circuit also updates a metrics value corresponding to the different wireless communication device in a metrics table where metrics values are associated with respective different wireless communication devices. The control circuit determines whether the metric values in the metrics table are each within a fulfilled communication range indicating a communication success rate being high, and transmits the transfer target data from the wireless transmitter in a broadcast mode in response to the number of the metrics values within the fulfilled communication range being within a transfer performable range.

14 Claims, 5 Drawing Sheets (51) Int. Cl.
  *H04W 4/46*   (2018.01)
  *H04W 24/08*  (2009.01)
  *H04W 84/18*  (2009.01)
  *H04W 48/20*  (2009.01)
  *H04W 84/00*  (2009.01)

(52) U.S. Cl.
  CPC .......... *H04W 48/20* (2013.01); *H04W 84/005* (2013.01); *H04W 84/18* (2013.01)

(56) References Cited

U.S. PATENT DOCUMENTS

| | | |
|---|---|---|
| 2008/0071919 A1* | 3/2008 | Gupta .................... H04L 43/10 709/231 |
| 2012/0268295 A1 | 10/2012 | Yuse et al. |
| 2013/0094398 A1* | 4/2013 | Das .................... H04W 40/246 370/254 |
| 2013/0121178 A1 | 5/2013 | Mainaud et al. |
| 2013/0301406 A1 | 11/2013 | Sakata |
| 2016/0269975 A1* | 9/2016 | Watanabe ............. H04L 45/123 |
| 2018/0184456 A1* | 6/2018 | Subramani ........ H04W 74/0816 |

FOREIGN PATENT DOCUMENTS

| | | |
|---|---|---|
| JP | 2012159967 A | 8/2012 |
| JP | 2014504089 A | 2/2014 |
| WO | WO-2011152023 A1 | 12/2011 |

\* cited by examiner

| i | 1 | 2 | 3 | 4 |  | N |
|---|---|---|---|---|---|---|
| IN-VEHICLE UNIT ID | ID=zz | ID=xx | ID=yy | ID=vv | · · · | ID=ww |
| METRICS | $M_1$ | $M_2$ | $M_3$ | $M_4$ | · · · | $M_N$ |

WIRELESS COMMUNICATION DEVICE FOR VEHICLE

CROSS REFERENCE TO RELATED APPLICATIONS

This application is a U.S. National Phase Application under 35 U.S.C. 371 of International Application No. PCT/JP2016/002611 filed on May 30, 2016 and published in Japanese as WO 2017/006508 A1 on Jan. 12, 2017. This application is based on and claims the benefit of priority from Japanese Patent Application No. 2015-138056 filed on Jul. 9, 2015. The entire disclosures of all of the above applications are incorporated herein by reference.

TECHNICAL FIELD

The present disclosure relates to a wireless communication device and, in particular, to a technology in which a wireless communication device transfers data.

BACKGROUND ART

There is known a wireless communication device that transfers data that was received from an outside source. Patent Literature 1 describes a wireless communication device, which is in a host vehicle and which receives data from another vehicle and transfers the received data in a multi-hop mode together with data of the host vehicle. Transferring data helps prevent a device needing data from failing to receive the data. Transferring data may be referred to as a hop; the number of times of transferring the data may be referred to as a hop count. Patent literature 1 sets an upper limit of a hop count, suppressing the data volume in vehicle-to-vehicle communication from increasing continuously.

PRIOR ART LITERATURES

Patent Literature

Patent literature 1: WO 2011/152023 A1

SUMMARY OF INVENTION

Setting such an upper limit of a hop count may still cause unnecessary data to be transferred; this cannot fully reduce the unnecessary data transfer or the loss in the communication resources.

The present disclosure is achieved based on such situation. It is an object of the present disclosure to provide a wireless communication device that transfers data to suppress a device needing such data from failing to receive the data while reducing losses in communication resources.

To achieve the above object, according to an aspect of the present disclosure, a wireless communication device is provided to include a wireless receiver receiving a transfer target data and a wireless transmitter transmitting the transfer target data received by the wireless receiver. The wireless communication device further includes a metrics calculating section, a table update section, and a transfer control section. The metrics calculation section calculates successively a metrics value that is metrics as an index indicating a communication success rate with a different wireless communication device different from the wireless communication device based on an electric wave received by the wireless receiver from the different wireless communication device. The table update section updates a metrics value, which corresponds to the different wireless communication device transmitting the electric wave received by the wireless receiver, into a metrics value calculated by the metrics calculation section in a metrics table in which the metrics values are associated with the different wireless communication devices, based on that the metrics calculation section calculates the metrics value. The transfer control section determines a metrics count indicating how many metrics values in the metrics table are within a fulfilled communication range indicating a communication success rate being high when the wireless receiver receives a transfer target data. The transfer control section transmits the transfer target data from the wireless transmitter based on that the metrics count is within a transfer performable range predetermined, whereas not transmitting the transfer target data from the wireless transmitter based on that the metrics count is outside of the transfer performable range.

According to the above aspect, the metrics calculation section calculates a metrics value successively as an index indicating a communication success rate with a different wireless communication device based on the electric wave received by the wireless receiver from the different wireless communication device. The table update section updates a metrics table in which different wireless communication devices are associated with respective metrics values. When the wireless receiver receives a transfer target data, the transfer control section determines whether the metric values in the metrics table are each within a fulfilled communication range indicating a communication success rate being high. The number of the metrics values within the fulfilled communication range indicates how many different wireless communication devices this wireless communication device can communicate with.

If the number of the metrics values within the fulfilled communication range is within a transfer performable number, the transfer target data is transmitted from this wireless transmitter. This helps prevent a device needing a transfer target data from failing to receive the transfer target data.

In contrast, the transfer control section does not transmit the transfer target data from the wireless transmitter if the number of the metrics values within the fulfilled communication range is outside of the transfer performable number. When a transfer target data cannot be transferred efficiently, the transfer target data is thus not transferred. This can also reduce losses in the communication resources.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
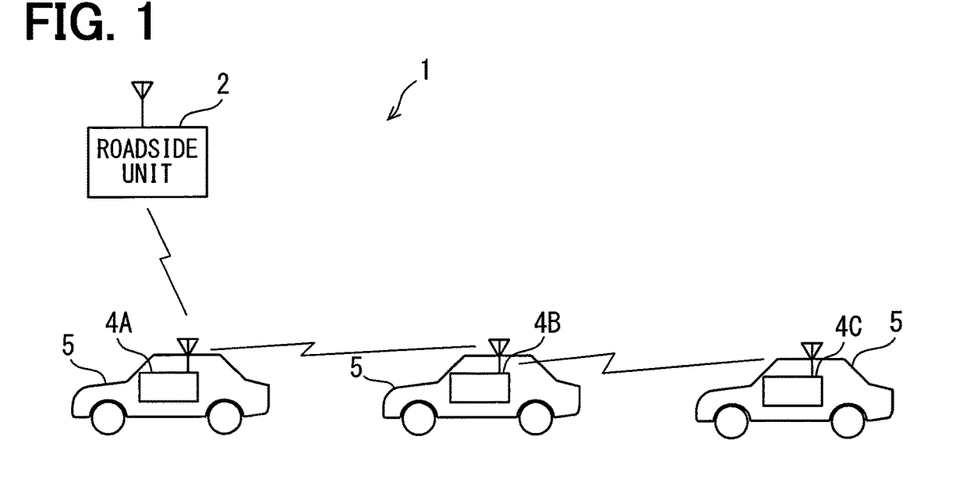
FIG. 1 is a diagram for explaining an overall configuration of a wireless communication system according to a first embodiment.

The following describes embodiments of the present disclosure with reference to drawings. As illustrated in FIG. 1, a wireless communication system 1 according to a first embodiment includes a roadside unit 2 and a plurality of in-vehicle units 4A to 4C. The in-vehicle units 4 are each equivalent to a wireless communication device.

[Brief Configuration of Wireless Communication System 1]

FIG. 1 illustrates one roadside unit 2; however, a plurality of roadside units may be included. FIG. 1 also illustrates three in-vehicle units 4A to 4C. Three in-vehicle units 4A to 4C each have the same configuration. When three in-vehicle units 4A to 4C are not differentiated from each other, these are represented by the in-vehicle unit(s) 4. Furthermore, the number of the in-vehicle units 4 is two or more, but not limited to a specific number.

In the wireless communication system 1, the roadside unit 2 communicates with the in-vehicle units 4 using a road-to-vehicle communication: the in-vehicle units 4 communicate with each other using a vehicle-to-vehicle communication, which may be used to transfer a data transmitted from the roadside unit 2.

The frequency channel of the road-to-vehicle communication and the frequency channel of the vehicle-to-vehicle communication may be the same or different from each other. The present embodiment exemplifies the frequency channel of the road-to-vehicle communication and the frequency channel of vehicle-to-vehicle communication each belonging to 5.8 GHz band or 5.9 GHz band.

The in-vehicle units 4A to 4C are mounted in respective vehicles 5. The vehicles 5 include various types of vehicles running roads such as a passenger car, a bus, a truck. FIG. 1 illustrates four-wheel vehicles; however, the vehicles 5 may be two-wheel vehicles. The two-wheel vehicle may include a bicycle.

The vehicles 5 mounted with the respective in-vehicle units 4A to 4C may be each referred to a host vehicle.

Note that "information," which may be used not only as an uncountable noun but also a countable noun, is equivalent to an information item. One information is equivalent to one information item; a plurality of informations are equivalent to a plurality of information items. Further, "data" is used also as one data or a plurality of data. One data is equivalent to one data item; a plurality of data are equivalent to a plurality of data items.

[Configuration of Roadside Unit 2]

The roadside unit 2 may be movable or fixed in a roadside. The roadside unit 2 executes the road-to-vehicle communication with an in-vehicle unit 4 that is present in a wireless communication area formed by the roadside unit 2, transmitting various information to the in-vehicle unit 4, receiving various information from the in-vehicle unit 4, and thereby executing a predetermined service.

The roadside unit 2 is installed in a position suitable for a service provided by the roadside unit 2. For example, the roadside unit 2 is provided in an intersection, a middle point between intersections connecting each other, a gateway to a specific facility (for example, a parking lot, a shop, a toll road), etc.

Figure 2:
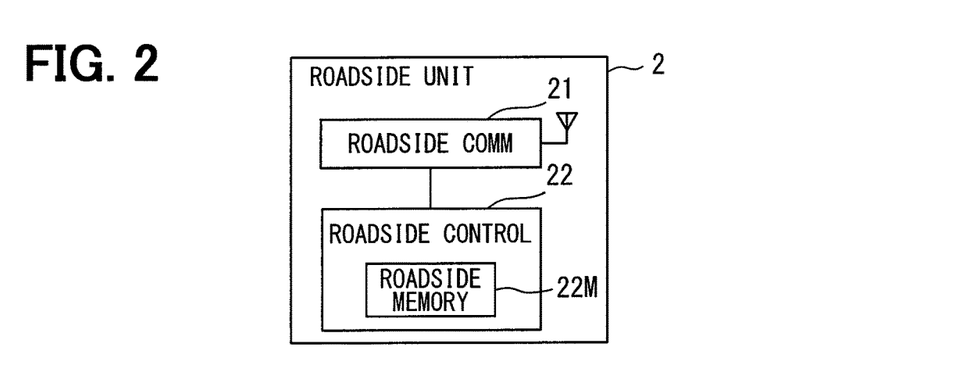
FIG. 2 is a diagram illustrating a configuration of a roadside unit.

The roadside unit 2 includes a roadside communication circuit 21 and a roadside control circuit 22 as in FIG. 2. The roadside communication circuit 21 and the roadside control circuit 22 are connected to communicate with each other.

The roadside communication circuit 21 executes a road-to-vehicle communication with an in-vehicle unit 4 that is present in a wireless communication area formed by the roadside unit 2. The roadside communication circuit 21 demodulates a signal received from the in-vehicle unit 4 and output it to the roadside control circuit 22, while modulating a data inputted from the roadside control circuit 22, converting to the electric waves to transmit.

The roadside control circuit 22 is configured to be a usual computer including known components: a CPU; nonvolatile memory such as ROM and flash memory; volatile memory such as a RAM; an I/O; and a bus line that connects the foregoing components.

The roadside memory 22M included in the roadside control circuit 22 is a nonvolatile storage media, for example, a flash memory or ROM in the roadside control circuit 22. The roadside memory 22M stores data and program modules for executing the various processes, and terminal IDs assigned to the roadside unit 2, etc. In addition, the roadside memory 22M further stores the information for generating the data that the roadside unit 2 transmits.

Figure 3:
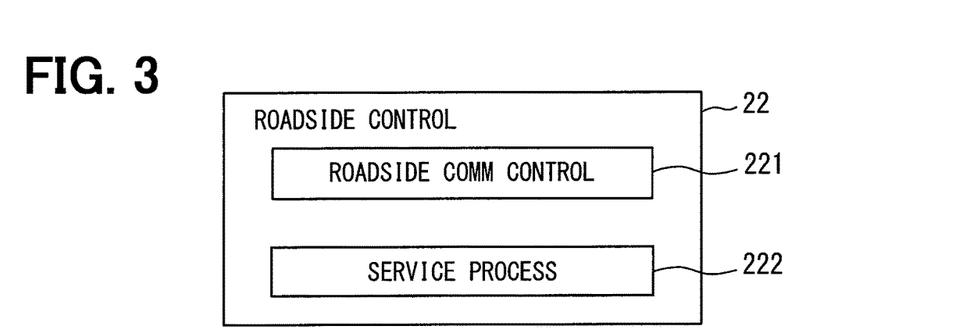
FIG. 3 is a block diagram illustrating functions of a roadside control circuit in FIG. 2.

The roadside control circuit 22 includes a roadside communication control unit 221 and a service processing unit 222 as functional blocks realized by executing the above-mentioned program modules, as in FIG. 3. All or part of the functions executed by the roadside control circuit 22 may be configured as hardware components such as one or more ICs.

The roadside communication control unit 221 generates the data that the roadside communication circuit 21 transmits, and transmits the generated data from the roadside communication circuit 21 in a broadcasting mode, for example. In addition, the roadside communication control unit 221 acquires a data that the roadside communication circuit 21 receives, and provides the data to the service processing unit 222.

The service processing unit 222 provides a predetermined service to an in-vehicle unit 4 present in a wireless communication area based on the data provided from the roadside communication control unit 221.

Figure 4:
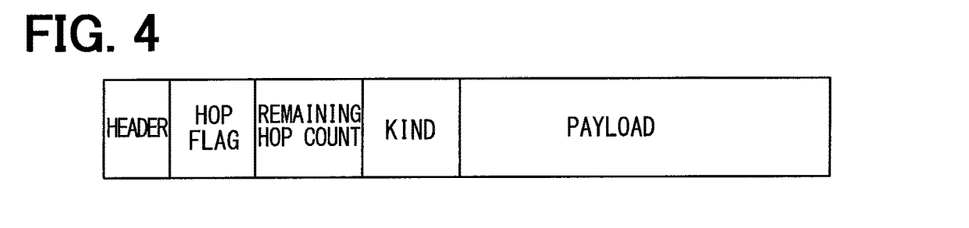
FIG. 4 is a diagram illustrating an example of a configuration of a roadside-unit data according to the first embodiment.

FIG. 4 illustrates a configuration of a data (a roadside-unit data, hereinafter) that the roadside communication control unit 221 generates and transmits from the roadside communication circuit 21. The roadside-unit data includes a header, a hop flag, a remaining hop count, a kind, and a payload, as in FIG. 4.

The header describes the information for an in-vehicle unit 4 that is a receiving end to recognize the telecommunications standard, etc. The information may further contain: the information for recognizing the kind of a data; the information for distinguishing a roadside-unit data from a data transmitted in the vehicle-to-vehicle communication; and the information for distinguishing the kind of a roadside-unit data when several kinds of a roadside-unit data are transmitted as the roadside-unit data.

The hop flag is a flag indicating either a hop necessity or a hop unnecessity. The hop necessity is represented by a hop flag having a value indicating validity; the hop unnecessity is represented by a hop flag having a value indicating invalidity.

The remaining hop count indicates how many hops the data is still allowed to undergo; the remaining hop count is represented using a subtracting manner. This remaining hop count is updated when an in-vehicle unit 4 transfers the roadside-unit data. The roadside communication control unit 221 sets an initial value to the remaining hop count. This initial value can be set to vary depending on the kinds of the payloads.

The kind of a data is the information indicating that an originating source unit that transmits the data for the first time is either a roadside unit 2 or an in-vehicle unit 4. If the originating source unit of the data is a roadside unit 2, this kind remains unchanged in the information indicating the roadside unit 2 even when the in-vehicle unit 4 transfers the roadside-unit data. That is, the kind is the data indicating whether or not this data is a roadside-unit data.

The payload is the information necessary for an in-vehicle unit 4 receiving the roadside-unit data to execute services. The services include a plurality of kinds of services; a payload is provided to be depending on each of the plurality of kinds of services.

As in FIG. 6 to be mentioned later, a control circuit 41 of an in-vehicle unit 4 executes a hop transfer based on that the data received by the wireless communication circuit 42 is a roadside-unit data, and the hop flag indicates a hop necessity. When the data is a roadside-unit data and the hop flag indicates a hop necessity, the payload is recognized as a transfer target data.

[Configuration of In-Vehicle Unit 4]

The following explains a configuration of an in-vehicle unit 4. As in FIG. 5, the in-vehicle unit 4 includes a control circuit 41, a wireless communication circuit 42, a GNSS receiver 43, an acceleration sensor 44, and a gyro sensor 45. The control circuit 41 is connected to perform a two-way communication with each of the wireless communication circuit 42, the GNSS receiver 43, the acceleration sensor 44, and the gyro sensor 45.

Figure 5:
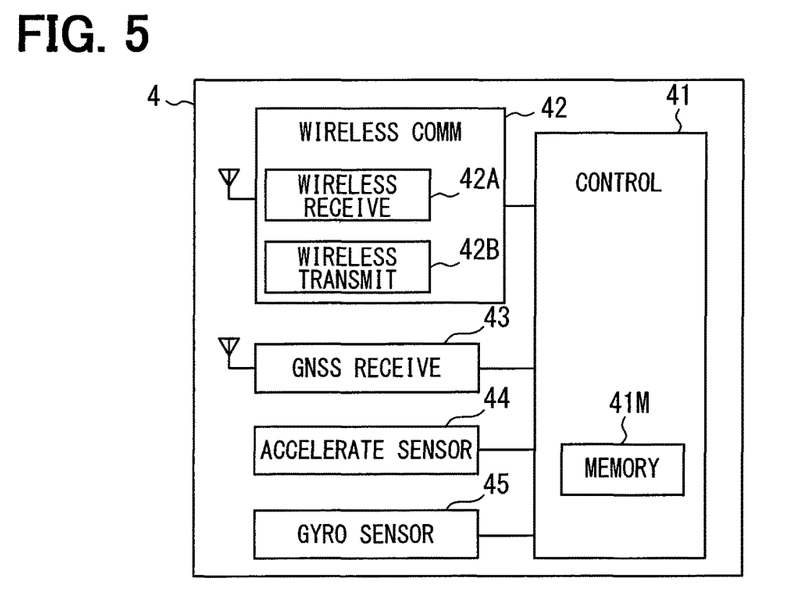
FIG. 5 is a block diagram illustrating a configuration of an in-vehicle unit in FIG. 1.

The wireless communication circuit 42 performs a wireless communication with a roadside communication circuit 21 or a wireless communication circuit 42 included in a different in-vehicle unit 4 other than the in-vehicle unit 4. Note that a different in-vehicle unit 4 is equivalent to a different wireless device (or a different wireless communication device). In contrast, an in-vehicle unit 4 itself performing a wireless communication with a different wireless communication device is referred to as a subject in-vehicle unit 4 or a subject wireless communication device. The wireless communication circuit 42 includes: a wireless receiver 42A that demodulates a signal received via an antenna and outputs to the control circuit 41; and a wireless transmitter 42B that modulates the data inputted from the control circuit 41 and converts into the electric waves to transmit to surroundings.

The GNSS receiver 43 receives the electric waves from the satellites used by GNSS (Global Navigation Satellite System), and acquires a current position of the GNSS receiver 43. The current position acquired by the GNSS receiver 43 indicates a latitude and longitude, for example. The current position acquired by the GNSS receiver 43 is provided to the control circuit 41 successively (e.g., each 100 milliseconds).

The acceleration sensor 44 detects an acceleration acting on the forth-and-back direction of a host vehicle. The in-vehicle unit 4 is attached to the host vehicle with a predetermined posture such that the detecting direction of the acceleration by the acceleration sensor 44 accords with the forth-and-back direction of the host vehicle. This host vehicle refers to a vehicle in which the in-vehicle unit 4 is mounted. In addition, the acceleration sensor 44 may be a three-axial acceleration sensor that detects accelerations which act on three axial directions mutually orthogonal such as the forth-and-back direction, the left-and-right direction, and the up-and-down direction of the host vehicle.

The gyro sensor 45 detects an angular rate about the vertical axis of the host vehicle under the state where the in-vehicle unit 4 is attached with a predetermined posture. The acceleration sensor 44 and the gyro sensor 45 are used for determining an assumed position of the in-vehicle unit 4.

The control circuit 41 is configured to be a usual computer including known components (none shown): a CPU; non-volatile memory such as ROM and flash memory; volatile memory such as a RAM; an I/O; and a bus line that connects the foregoing components.

The memory 41M included in the control circuit 41 is a nonvolatile storage media, for example, a flash memory or ROM in the control circuit 41. The memory 41M stores program modules and data for executing the various processes, a terminal ID assigned to the in-vehicle unit 4, a metrics table to be mentioned later, etc.

The control circuit 41 executes the program module to thereby execute a process for executing a predetermined service based on a roadside-unit data received by the wireless communication circuit 42.

In addition, the control circuit 41 transmits the data to a different in-vehicle unit 4 successively with the vehicle-to-vehicle communication. The data transmitted with the vehicle-to-vehicle communication includes the information indicating the current position of this in-vehicle unit 4 and the in-vehicle unit ID of this in-vehicle unit 4.

Figure 6:
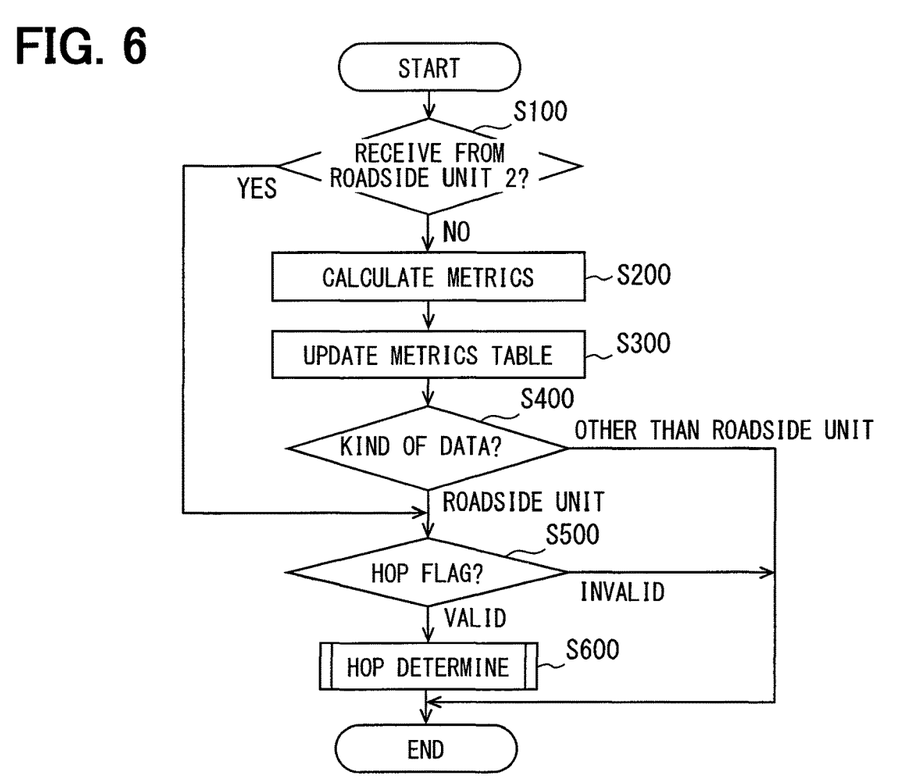
FIG. 6 is a flowchart illustrating a process executed by a control circuit in FIG. 5.

In addition, the control circuit 41 executes a process in FIG. 6 when receiving the data from the wireless communication circuit 42 (i.e., when the wireless communication circuit 42 receives the electric waves transmitted by a roadside unit 2 or a different in-vehicle unit 4). All or part of the functions executed by the control circuit 41 may be configured as hardware components such as one or more ICs.

[Process by Control Circuit 41]

It is further noted that the described flowchart includes sections (also referred to as steps), which are represented, for instance, as S100. Further, each section can be divided into several sections while several sections can be combined into a single section. Each section may be referred to as a device or a specific name, or with a structure modification; for instance, a table rewriting section may be also referred to as a table rewriting device or a table rewriter. Further, as explained above, each section can be achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

In FIG. 6, at S100, it is determined whether a data received by the wireless communication circuit 42 is from a roadside unit 2. This determination is made from the information stored in the header of the received data. Alternatively, it may be made from the information other than the header (for example, from the kind). If the determination at S100 is made YES, the sequence proceeds to S500; if NO, it proceeds to S200.

At S200 equivalent to a metrics calculation section, a metrics M is calculated. The metrics M in the present embodiment is an index indicating a probability of success in the vehicle-to-vehicle communication with a different in-vehicle unit 4. Calculating the metrics M uses three factors of a post-reception elapsed time mt, an electric wave strength mr, and a communication distance md. A metrics M may be also referred to as a metrics value.

The post-reception elapsed time mt is a period of time from the last reception time (i.e., the clock time when the data from a different in-vehicle unit 4 is received) to the present clock time. The electric wave strength mr is a reception strength of the electric wave received most recently from a different in-vehicle unit 4. The communication distance md is a distance between (i) the current position of the in-vehicle unit 4 (hereinafter, a subject in-vehicle unit 4) which executes this process in FIG. 6 and (ii) the current position, if present, included in the data from the different in-vehicle unit 4. The current position of the subject in-vehicle unit 4 is either a current position acquired by the GNSS receiver 43 or an assumed position determined based on the signals of the acceleration sensor 44 and the gyro sensor 45.

The metrics M is calculated with a formula 1 using the post-reception elapsed time mt, the electric wave strength mr, and the communication distance md. Further, the formula 1 uses weighting factors wt, wr, and wd that are previously set to the post-reception elapsed time mt, the radio field intensity mr, and the communication distance md, respectively. In addition, ID is a sign identifying an in-vehicle unit 4 that transmits the electric wave.

$$M(ID)=mt \times wt+mr \times wr+md \times wd \quad \text{(Formula 1)}$$

Figure 7:
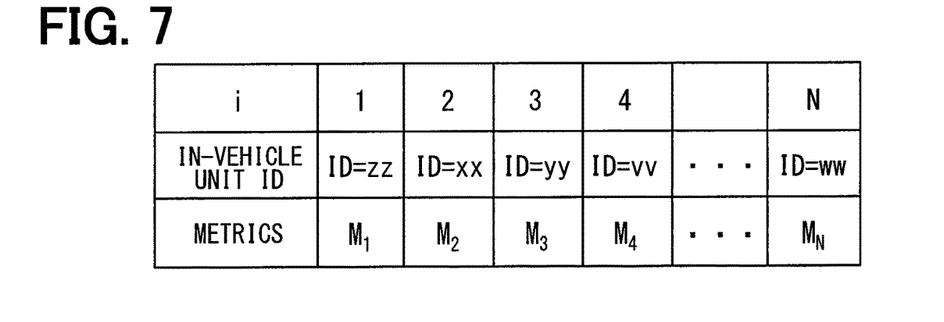
FIG. 7 is a diagram for explaining a metrics table.

At S300 equivalent to a table update section or a table rewriting section, the metrics table is updated or rewritten. FIG. 7 is a diagram for explaining a metrics table. As in FIG. 7, the metrics table is a table where the metrics M is described according to each in-vehicle unit ID. That is, a plurality of metrics values are respectively described for a plurality of in-vehicle unit IDs.

Suppose that the in-vehicle unit ID of an in-vehicle unit 4 having received the data at the present time is contained in the metrics table. In such a case, the described metrics M corresponding to the in-vehicle unit ID is updated into the metrics M calculated at previous S200.

Suppose that the in-vehicle unit ID of an in-vehicle unit 4 having received the data at the present time is not contained in the metrics table. In such a case, this in-vehicle unit ID is added to the metrics table, and the metrics M calculated at previous S200 is added as the metrics M corresponding to the in-vehicle unit ID.

At S400, it is determined whether the kind of the received data is a roadside-unit data or a data other than the roadside-unit data. Note that S400 is executed when the determination of S100 is made NO. When the determination at S100 is made NO, the data is determined to be received from an in-vehicle unit 4. However, the in-vehicle unit 4 may transfer a roadside-unit data at a hop determination at S600 to be mentioned later. In contrast, an in-vehicle unit 4 may transmit a data other than a roadside-unit data. Thus, the kind of the data needs to be determined at S400.

The kind of the data is determined from the kind contained in the data. When the kind contained in the received data is a roadside unit 2, it is determined that the kind of the data is a roadside-unit data. When the kind is not contained in the received data or when the kind of the data is an in-vehicle unit 4, it is determined that the kind of the data is other than a roadside-unit data.

When it is determined that the kind of the data is a roadside-unit data, the sequence proceeds to S500; when it is determined that the kind of the data is other than a roadside-unit data, the process in FIG. 6 is ended. In addition, also when the determination at S100 is made YES, the sequence proceeds to S500.

At S500, it is determined whether the hop flag is valid or invalid. When the hop flag is invalid, the process in FIG. 6 is ended. When the hop flag is valid, the sequence proceeds to S600.

At S600, a hop determination is performed. This hop determination determines whether or not to transfer the data received this time, and is equivalent to a transfer control section. The hop determination is illustrated in FIG. 8 in detail.

Figure 8:
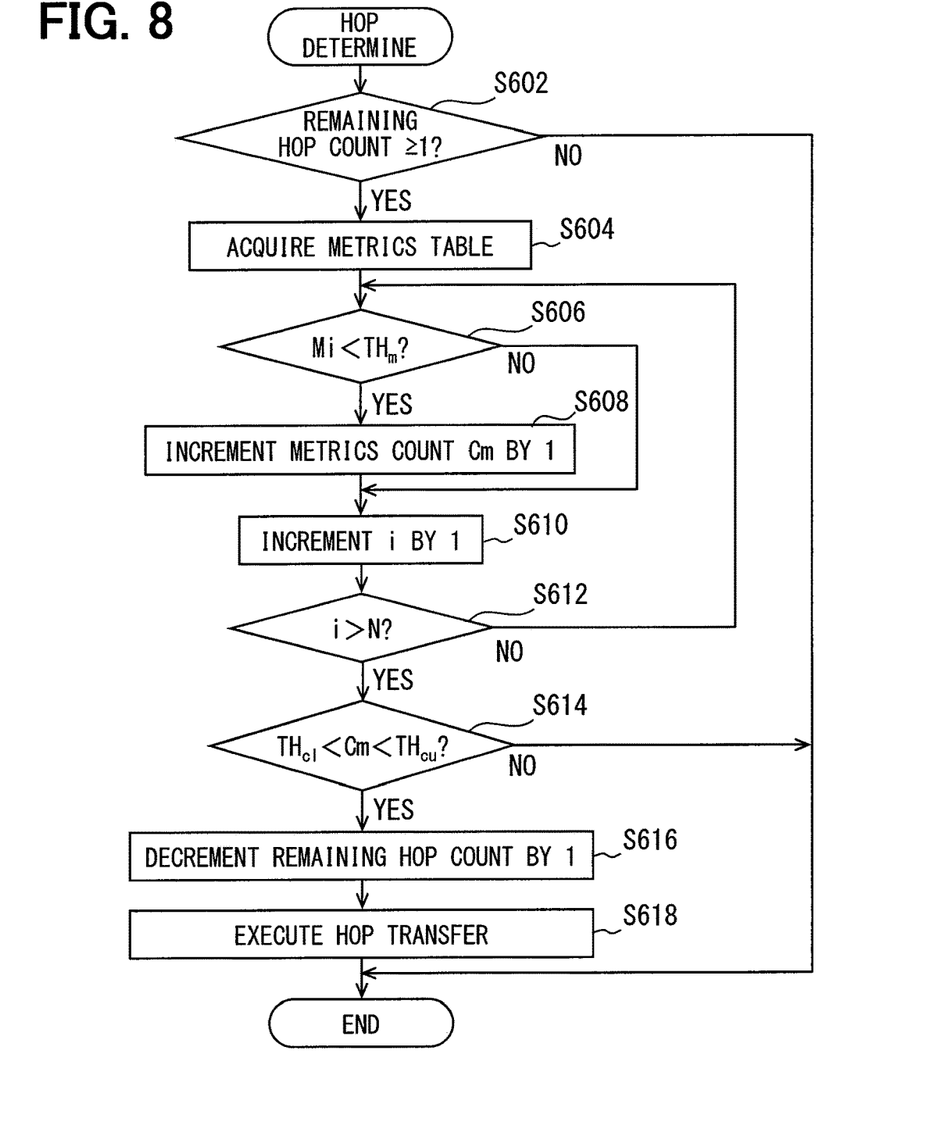
FIG. 8 is a flowchart illustrating in detail a hop determination at S600 in FIG. 6.

In FIG. 8, at S602, it is determined whether a remaining hop count contained in the data received this time is one (1) or more (>1). When this determination is made NO, the remaining hop count is zero (0). If the determination at S602 is made NO, the hop determination is ended. When the remaining hop count is zero, the roadside-unit data received this time is not transferred. If the determination at S602 is made YES, the sequence proceeds to S604.

At S604, the metrics table is acquired. At S606, it is determined whether the i-th metrics Mi in the metrics table is smaller than a fulfilled communication threshold value THm set previously. The initial value of "i" is 1.

In the present embodiment, as the metrics M is smaller, the communication success rate is higher. The determination at S606 thus determines whether the i-th metrics Mi in the metrics table has a value signifying that the communication success rate is high. Furthermore, the determination at S606 resultingly determines whether the communication with an in-vehicle unit 4 having the in-vehicle unit ID corresponding to the metrics Mi indicates a high probability.

Note that a fulfilled communication threshold value THm, which is set previously based on experiments, is a positive value. The range of the positive value smaller than the fulfilled communication threshold value THm corresponds to a fulfilled communication range.

If the determination at S606 is made YES, the sequence proceeds to S608. At S608, a metrics count Cm is incremented by one. The metrics count Cm represents the number of different in-vehicle units 4 each having a high probability in success of the communication. The initial value of the metrics count Cm is 0. If S608 is executed, the sequence proceeds to S610. In contrast, when the determination at S606 is made NO, the sequence proceeds to S610 without executing S608.

At S610, i is incremented by one. At S612, it is determined whether i is greater than N. This N is a total data number in the metrics table. If the determination at S612 is made NO, the sequence returns to S606; then, the processing at S606 and subsequent is executed for the i-th metrics Mi updated at S610.

If the determination at S612 is made YES, the sequence proceeds to S614. At S614, it is determined whether the metrics count Cm is greater than a lower limit value THcl of a transfer performable range, and smaller than an upper limit value THcu of the transfer performable range. As above-mentioned, the metrics count Cm indicates the number of different in-vehicle units 4 each having a high probability in success of the communication. At S614, it is thus determined that the number of different in-vehicle units 4 with a high probability in success of the communication is in between the lower limit value THcl of the transfer performable range and the upper limit value THcu of the transfer performable range.

The lower limit value THcl of the transfer performable range is set to an integer from 5 to 10, for example; the upper limit value THcu of the transfer performable range is set to a value significantly greater than the lower limit value THcl. The reason for setting the lower limit value THcl of the transfer performable range to such a value is as follows. Suppose that the number of different in-vehicle units 4 with a high communication success rate is too small. In such case, the communication resources cannot be used efficiently even if they are used to transfer the roadside-unit data; the losses of the communication resources cannot be reduced fully.

In addition, the reason for setting the upper limit value THcu of the transfer performable range is as follows. When the metrics count Cm exceeds the upper limit value THcu of the transfer performable range, a great number of different in-vehicle units 4 with a high communication success rate are present. If the upper limit value THcu of the transfer performable range is not provided, a great number of different in-vehicle units 4 each execute the process in FIG. 8 to thereby execute a great number of hop transfers, causing the losses in the communication resources.

If the determination at S614 is made NO, the hop determination in FIG. 8 is ended. When the determination at S614 is made YES, the sequence proceeds to S616. At S616, the remaining hop count contained in the received roadside-unit data is decremented by one. At S618, the hop transfer is executed. That is, the roadside-unit data whose remaining hop count is updated at S616 is transmitted from the wireless communication circuit 42. This transmission is made in a broadcasting mode. A roadside-unit data transmitted from the wireless communication circuit 42 may be attached with the information indicating that this roadside-unit data is a data transferred from an in-vehicle unit 4.

Summary of First Embodiment

The above-mentioned first embodiment is provided as follows. Based on the electric wave received from a different in-vehicle unit 4, the metrics M that is an index indicating a success rate in the communication with the different in-vehicle unit 4 is calculated successively (S200); the metrics table is updated with the calculated metrics M (S300).

In addition, when the hop flag of the roadside-unit data received by the wireless communication circuit 42 is valid, it is determined whether each metrics M contained in the metrics table is in a fulfilled communication range (S606). When the metrics count Cm indicating the number of the metrics M(s) in the fulfilled communication range is within the transfer performable range (S614: YES), the roadside-unit data is transmitted from the wireless communication circuit 42 (S616).

The roadside-unit data is thus transferred if the number of different in-vehicle units 4 with a high probability in success of the communication is within the transfer performable range. This helps prevent an in-vehicle unit 4 needing a roadside-unit data from failing to receive the roadside-unit data.

Further, if the number of different in-vehicle units 4 with a high probability in success of the communication is outside of the transfer performable range (S614: NO), the roadside-unit data is not transmitted from the transmitter of the wireless communication circuit 42. When a transfer target data cannot be transferred efficiently, the transfer target data is thus not transferred. This can also reduce losses in the communication resources.

Second Embodiment

The following explains a second embodiment. In the explanation of the second embodiment, an element may be assigned with the reference number identical to that of the element explained in the first embodiment unless otherwise specifically described. When only part of the configuration of the second embodiment is explained, the other part of the configuration may adopt that of the first embodiment previously explained.

Figure 9:
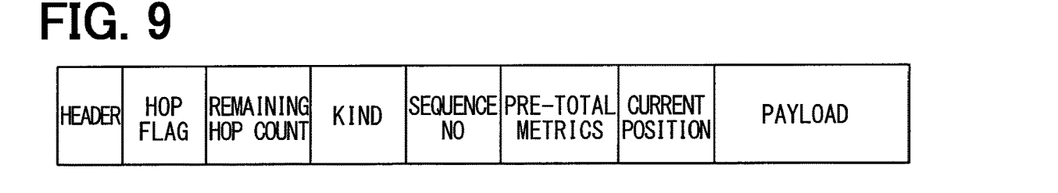
FIG. 9 is a diagram illustrating an example of a configuration of a roadside-unit data according to a second embodiment.

FIG. 9 illustrates a configuration of a roadside-unit data transmitted by the roadside unit 2 in the second embodiment. As in FIG. 9, in the second embodiment, a roadside-unit data includes a header, a hop flag, a remaining hop count, a kind, and a payload, all of which are identical to those in the first embodiment. Furthermore, the roadside-unit data in the second embodiment further includes a sequence number, a pre-total metrics, and a current position.

The sequence number, which is assigned to each roadside-unit data, is equivalent to the data-specifying information.

The pre-total metrics, which is also referred to as a pre-total metrics value, is a value estimating a total value of the metrics M(s) relative to a data transfer route reaching the in-vehicle unit 4 having received a roadside-unit data that has been transferred. The originating source of the data transfer route is a roadside unit 2; at the time when this roadside unit 2 transmits the data, the pre-total metrics is still zero.

The current position is a position at which a unit having transmitted the roadside-unit data. When the roadside unit 2 transmits the data, this current position is unnecessary; when an in-vehicle unit 4 transfers the roadside-unit data, the current position of the in-vehicle unit 4 is described as this current position.

Figure 10:
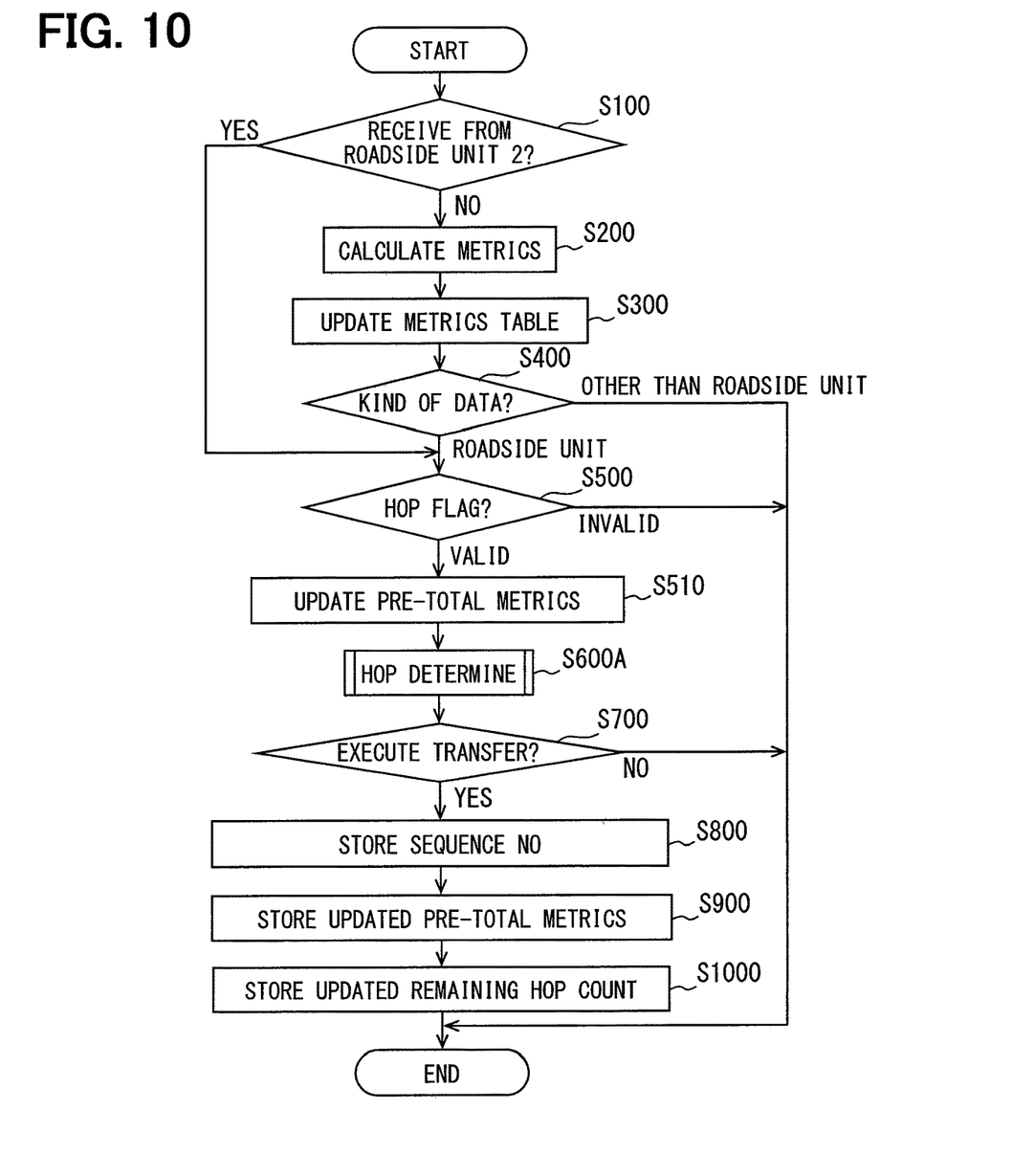
FIG. 10 is a flowchart illustrating a process executed as substitute for FIG. 6, according to the second embodiment.

FIG. 10 is a flowchart illustrating a process executed as substitute for FIG. 6 in the first embodiment, according to the second embodiment. FIG. 10 is different from FIG. 6 in S510, S700, S800, S900, and S1000, all of which are added, and in S600A, which is substituted for S600.

At S500, when it is determined that the hop flag is valid, the sequence proceeds to S510. S510 is equivalent to a pre-total metrics update section or rewriting section. At S510, a pre-total metrics is updated or rewritten. In detail, the greatest metrics M is selected from among the metrics M(s) smaller than a fulfilled communication threshold value THm out of all the metrics M(s) in the metrics table; then, the selected greatest metrics M is added to the pre-total metrics contained in the roadside-unit data.

Adding the metrics M contained in the metrics table to the pre-total metrics contained in the roadside-unit data allows an estimation of a total of metrics M(s) when a different in-vehicle unit 4 receives the roadside-unit data that is transferred at S630 to be mentioned later.

As above, the greatest metrics M selected from among the metrics M(s) smaller than a fulfilled communication threshold value THm out of all the metrics M in the metrics table is added. The reason for such an addition of the greatest metrics is because the roadside-unit data, which is transmitted in broadcasting at S630, may be received by a plurality of different in-vehicle units 4. When the roadside-unit data is received by a plurality of different in-vehicle units 4, the total value of the metrics M(s) relative to the data transfer route also changes depending on an in-vehicle unit 4 that receives the roadside-unit data.

The value added to the pre-total metrics in the roadside-unit data is the greatest value from among the values smaller than a fulfilled communication threshold value THm out of all the metrics M in the metrics table. Such adding the greatest value allows the estimation of a total value of the metrics M signifying a reception state of the roadside-unit data received in the most unfulfilled state.

The pre-total metrics updated as in the above is used for determination at S626 in FIG. 11 to be explained later. This allows the determination whether a roadside-unit data is able to be transferred under a total value of metrics (i.e., the pre-total metrics) smaller than that when the roadside-unit data was transferred in the past.

If S510 is executed, the sequence proceeds to S600A. At S600A, a hop determination is performed. The details of the process at S600A are illustrated in FIG. 11. In FIG. 11, the processing up to S614 is the same as those in FIG. 8; S602 to S612 are omitted in FIG. 11.

In the hop determination in the second embodiment, even if the determination at S614 is made YES, the determinations at S620, S622, S624, and S626 are performed whether to execute a hop transfer.

When the determination at S614 is made YES, the sequence proceeds to S620. At S620, it is determined whether the different in-vehicle unit 4 being a transmitting source is present ahead in the heading direction of the vehicle 5 (i.e., host vehicle) mounted with the in-vehicle unit 4 executing the process in FIG. 11. The heading direction of the host vehicle is determined from the locus of the current position. The current position of a different in-vehicle unit 4 is included in a roadside-unit data when the different in-vehicle unit 4 transmits the roadside-unit data, as illustrated in FIG. 9. When the direction of the different in-vehicle unit 4, which is determined from the current position of the different in-vehicle unit 4 and the current position of the host vehicle, is within a predetermined range against the heading direction of the host vehicle, the different in-vehicle unit 4 being a transmitting source is determined to be present ahead in the heading direction.

Figure 11:
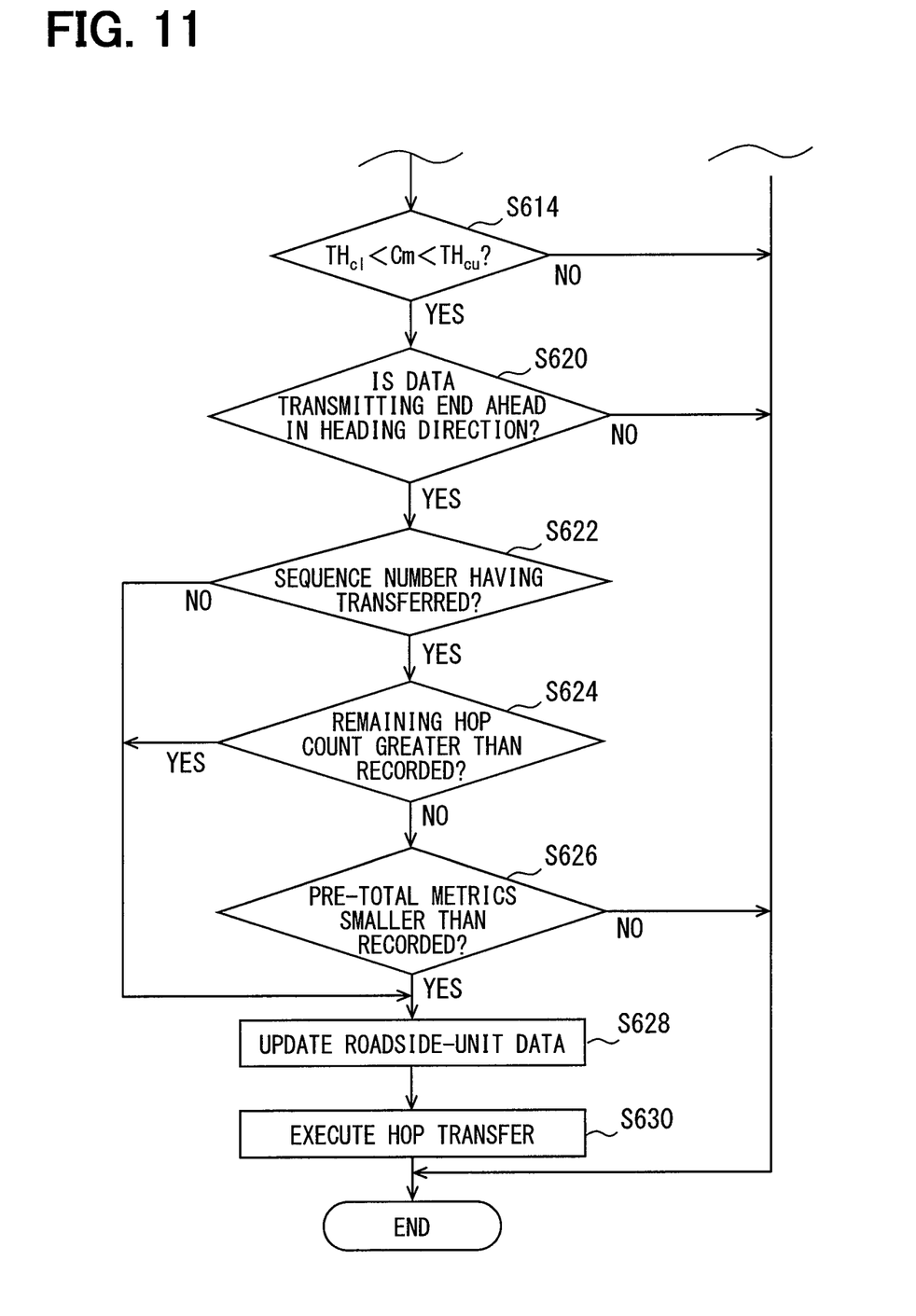
FIG. 11 is a flowchart illustrating in detail a hop determination at S600A in FIG. 10.

When the determination at S620 is made NO, the present process in FIG. 11 is ended. Therefore, in the second embodiment, even if the metrics count Cm is within the transfer performable range, the roadside-unit data is not transferred when the different in-vehicle unit 4 having transmitted the roadside-unit data is not present ahead in the heading direction of the host vehicle. This limits the destination to which the roadside-unit data is transferred to an area rearward of the vehicle 5 running a road. The roadside-unit data is often unnecessary in an area lateral to or area ahead of the host vehicle running in the heading direction other than an area rearward of the host vehicle running in the heading direction. The roadside-unit data is thus limited to be transferred to an area rearward of the host vehicle running in the heading direction. This can further suppress unnecessary data from being transmitted.

If the determination at S620 is made YES, the sequence proceeds to S622. At S622, it is determined whether the sequence number contained in the roadside-unit data received this time is a sequence number that has been transferred already.

At the present embodiment, as explained at S800 and subsequent to be mentioned later, when the hop transfer is executed, the sequence number, the remaining hop count, and the pre-total metrics, all of which are contained in the transferred roadside-unit data, are stored in the memory 41M. Thus, at S622, it is determined whether the sequence number that has been transferred already and stored in the memory 41M accords with the sequence number contained in the roadside-unit data received this time. In the second embodiment, the memory 41M is equivalent to a storage.

When the sequence number that has been transferred already and stored in the memory 41M does not accord with the sequence number contained in the roadside-unit data received this time, the determination at S622 is made NO. When the sequence number contained in the roadside-unit data received this time is not stored in the memory 41M, the determination at S622 is also NO. When the determination at S622 is made NO, the sequence proceeds to S628 and S630. At S630, the hop transfer is executed. When the roadside-unit data received this time has not been transferred yet, the hop transfer is determined to be executed without any determinations at S624 and S626.

When the determination at S622 is made YES, the sequence proceeds to S624. At S624, it is determined whether the remaining hop count contained in the roadside-unit data received this time is larger than the remaining hop count in the same roadside-unit data stored in the memory 41M. If this determination is made NO, the sequence proceeds to S626; if YES, it proceeds to S628. When the sequence proceeds to S628, the hop transfer is executed at S630.

Therefore, in the present embodiment, even if the same roadside-unit data is transferred in the past, the roadside-unit data is transferred only when the remaining hop count is greater than that in the past. In other words, when the hop count is smaller than that in the past, the roadside-unit data is transferred. When the hop count is smaller than that in the past, the data quality at present time is estimated to be better than that in the past.

At S626, it is determined whether the pre-total metrics determined at S510 is smaller than the pre-total metrics in the same roadside-unit data currently stored in the memory 41M. When this determination is made NO, the process in FIG. 11 is ended; when it is made YES, the sequence proceeds to S628. When the sequence proceeds to S628, the hop transfer is executed at S630.

Therefore, when the pre-total metrics is smaller than the pre-total metrics currently recorded in the memory 41M, the roadside-unit data is transferred again even if being transferred in the past.

At S628, the remaining hop count, the pre-total metrics, and the current position are updated in the roadside-unit data. The remaining hop count contained in the received roadside-unit data is decremented by one (1) and used for updating. The pre-total metrics determined at S510 is used for updating. The current position of the host vehicle is used for updating.

At S630, the roadside-unit data updated at S628 is transmitted in a broadcasting mode from the wireless communication circuit 42. A roadside-unit data transmitted from the wireless communication circuit 42 may be attached with the information indicating that this roadside-unit data is a data transferred from an in-vehicle unit 4.

The explanation is returned to FIG. 10. At S700, it is determined at S600A whether the hop transfer is executed. When this determination is made NO, the process in FIG. 10 is ended; when it is made YES, the sequence proceeds to S800.

At S800 to S1000, the hop management information stored in the memory 41M is updated. In detail, the hop management information includes the sequence number, the pre-total metrics, and the remaining hop count; the pre-total metrics and the remaining hop count are stored in the memory 41M to be associated with the sequence number.

At S800, the sequence number that is contained in the roadside-unit data transferred in the hop transfer is stored (recorded) in the memory 41M. When this sequence number is already stored, nothing is executed at S800. This S800 is equivalent to a transfer data storage processing section or a transfer data record section.

At S900, the pre-total metrics determined at S510 is stored (recorded) in the memory 41M to be associated with the sequence number. When the pre-total metrics associated with the sequence number is already stored, the pre-total metrics already stored is changed to the pre-total metrics updated at S510. This S900 is equivalent to a pre-total metrics storage processing section or a pre-total metrics record section.

At S1000, the remaining hop count determined at S628 is stored (recorded) in the memory 41M to be associated with the sequence number. When the remaining hop count associated with the sequence number is already stored, the remaining hop count already stored is updated to the remaining hop count determined at S628. This S1000 is equivalent to a hop count storage processing section or a hop count record section.

Summary of Second Embodiment

According to the above second embodiment, whether the roadside-unit data received by the wireless communication circuit 42 has been transferred already is determined based on whether the sequence number of the roadside-unit data received this time is stored in the memory 41M (S622). Based on this determination result, it is determined whether the hop transfer is executed or not; this suppresses an unnecessary transfer.

In addition, even if it is determined that the roadside-unit data has been transferred already (S622: YES), the hop transfer is executed when the remaining hop count is greater than the remaining hop count of the same roadside-unit data stored in the memory 41M (S624: YES). This allows the transfer of the roadside-unit data whose data quality may be better than the roadside-unit data transferred in the past.

In addition, even if it is determined that the roadside-unit data has been transferred already (S622: YES), the hop transfer is executed also when the pre-total metrics is smaller than the pre-total metrics of the same roadside-unit data stored in the memory 41M (S626: YES). This allows the transfer of the roadside-unit data whose communication success rate is higher than that of the roadside-unit data transferred in the past.

The embodiment of the present disclosure is described in the above; however, the present disclosure is not limited to the above embodiment. The following modification embodiment is also included in the technical scope of the present disclosure; furthermore, other than the following is also included in the technical scope of the present disclosure as long as not deviating from a technical subject matter.

First Modification

In the second embodiment, even if it is determined that the roadside-unit data has been transferred already (S622: YES), the hop transfer is executed when the determination at S624 is made YES or when the determination at S626 is made YES. However, when it is determined that the roadside-unit data has been transferred already, it may be determined that the hop transfer is unexecuted without performing any determination at S624 or S626.

Second Modification

In addition, any one among the determinations at S620, S622, S624, and S626, may be performed, or any two or any three may be performed alternatively.

Third Modification

In addition, in the second embodiment, when either the determination at S624 or the determination at S626 is made YES, the hop transfer is executed. In contrast, when both the determination at S624 and the determination at S626 are YES, the hop transfer may be executed.

Fourth Modification

In the above-mentioned embodiments, when the roadside-unit data is received, the metrics table is always updated. In contrast, suppose a case that it is determined whether a roadside-unit data is transmitted from an in-vehicle unit 4 which is ahead of a host vehicle running in the heading direction, and it is then determined that the in-vehicle unit 4 is not ahead of the host vehicle in the heading direction. In such a case, the metrics table using the roadside-unit data may not be updated. Note that the determination of being ahead of the host vehicle in the heading direction may be the same as S620.

This signifies that the metrics table resulting indicates the communication success rate with an in-vehicle unit 4 mounted in a vehicle 5 whose heading direction is the same as that of the host vehicle. Since an in-vehicle unit 4 is mounted in and used by a host vehicle 5, the roadside-unit data from a vehicle whose heading direction is different from the host vehicle 5 is low in necessity. The second modification thus suppresses unnecessary roadside-unit data from being transferred.

Fifth Modification

In the above-mentioned embodiments, although the sequence number is the data-identifying information, the payload itself may be employed as the data-identifying information.

Sixth Modification

In the above-mentioned embodiments, in the update of the pre-total metrics, the greatest metrics M is selected from among the metrics M(s) smaller than a fulfilled communication threshold value THm out of all the metrics M in the metrics table; then, the selected greatest metrics M is added to the pre-total metrics contained in the roadside-unit data. However, instead of the greatest metrics, any metrics M may be selected from among the metrics M(s) smaller than a fulfilled communication threshold value THm out of all the metrics M in the metrics table.

Seventh Modification

In the above-mentioned embodiments, the metrics M is a smaller value as the communication success rate is higher; by contrast, the metrics M may be a larger value as the communication success rate is higher. In this case, a value equal to or greater than a certain threshold value becomes a fulfilled communication range.

Eighth Modification

The wireless communication device of the present disclosure may be used in a mobile object other than a vehicle 5. In addition, the wireless communication device may be a fixed type.

Ninth Modification

In the above-mentioned embodiments, although the lower limit value THcl of the transfer performable range is set to be an integer between 5 and 10, this lower limit value may be just a value equal to or greater than two (2).

Tenth Modification

In the above-mentioned embodiments, although the transfer performable range is assigned with the lower limit value THcl and the upper limit value THcu, at least either the lower limit value THcl or the upper limit value THcu may be assigned.

Eleventh Modification

In the above-mentioned embodiments, the metrics M is calculated using the post-reception elapsed time mt, the electric wave strength mr, and the communication distance md. However, the metrics M may be calculated using any one or two of the post-reception elapsed time mt, the electric wave strength mr, and the communications distances md. In addition, another parameter may be used for calculating the metrics M as substitute of or addition to the post-reception elapsed time mt, the electric wave strength mr, and the communication distance md.

Twelfth Modification

In the above-mentioned embodiments, a roadside unit 2 and an in-vehicle unit 4 communicate using the frequency channel of 5.8 GHz band or 5.9 GHz band. However, a roadside unit 2 and an in-vehicle unit 4 may communicate using the frequency channel belonging to the 2.4 GHz band, or the frequency channel belonging to another frequency band.

Although the present disclosure is described based on the embodiment, it is understood that the present disclosure does not need to be limited to the embodiment or its configuration. The present disclosure also includes various modification examples and modifications within a scope of an equivalent. In addition, various combinations or embodiments, and other combinations or embodiments which contain only a single element, more than one element, or less than it may be included within a scope or concept of the present disclosure.

What is claimed is:

1. A wireless communication device including a wireless receiver receiving a transfer target data and a wireless transmitter transmitting the transfer target data received by the wireless receiver, the wireless communication device communicating with a plurality of different wireless communication devices identical to the wireless communication device in function, the wireless communication device comprising:
a control circuit including a processor, the control circuit configured to
successively calculate a metrics value that is an index indicating a communication success rate with one of the different wireless communication devices based on an electric wave received by the wireless receiver from the one of the different wireless communication devices;
update a metrics value, which corresponds to the one of the different wireless communication devices transmitting the electric wave received by the wireless receiver, into a metrics value calculated based on the electric wave received by the wireless receiver in a metrics table in which metrics values are associated with the respective different wireless communication devices, based on that the metrics value is calculated based on the received electric wave;
determine a metrics count indicating how many metrics values in the metrics table are within a fulfilled communication range indicating a communication success rate being high when the wireless receiver receives a transfer target data;
transmit the transfer target data from the wireless transmitter in a broadcast mode in response to the metrics count being within a predetermined transfer performable range; and
not transmit the transfer target data from the wireless transmitter in response to the metrics count being outside of the transfer performable range, wherein
the transfer performable range is assigned with an upper limit value, and
the transfer performable range is assigned with a lower limit value being equal to or greater than two.

2. The wireless communication device according to claim 1, wherein
the transfer target data is one of a plurality of transfer target data that are different mutually, and wherein
the control circuit is further configured to
store, in a storage, data-identifying information that identifies the transfer target data transmitted from the wireless transmitter, and
determine whether the transfer target data received by the wireless receiver is to be transmitted from the wireless transmitter based on whether the data-identifying information corresponding to the transfer target data received by the wireless receiver is stored in the storage.

3. The wireless communication device according to claim 2, wherein:
in cases that the data-identifying information corresponding to the transfer target data received by the wireless receiver is stored in the storage, the control circuit is further configured to not transmit the transfer target data from the wireless transmitter; and
in cases that the data-identifying information corresponding to the transfer target data received by the wireless receiver is not stored in the storage, the control circuit is further configured to transmit the transfer target data from the wireless transmitter.

4. The wireless communication device according to claim 1, wherein:
the wireless communication device and the different wireless communication devices are used in respective vehicles that are mutually different;
when the wireless receiver receives the other transfer target data from the different wireless communication device, the control circuit is further configured to determine whether the different wireless communication device is present ahead of the wireless communication device and in a heading direction of the wireless communication device; and when the control circuit determines that the different wireless communication device is not present ahead of the wireless communication device and in the heading direction of the wireless communication device, the control circuit is further configured to not transmit the transfer target data from the wireless transmitter.

5. The wireless communication device according to claim 1, wherein:
the wireless communication device and the different wireless communication devices are used in respective vehicles that are mutually different;
when the wireless receiver receives the other transfer target data from the different wireless communication device, the control circuit is further configured to determine whether the different wireless communication device is present ahead of the wireless communication device and in a heading direction of the wireless communication device; and
when the control circuit determines that the different wireless communication device is not present ahead of the wireless communication device and in the heading direction of the wireless communication device, the control circuit is further configured to not update the metrics table based on the transfer target data received from the different wireless communication device.

6. A wireless communication device including a wireless receiver receiving a transfer target data and a wireless transmitter transmitting the transfer target data received by the wireless receiver, the wireless communication device communicating with a plurality of different wireless communication devices identical to the wireless communication device in function, the wireless communication device comprising:
a control circuit including a processor, the control circuit configured to
successively calculate a metrics value that is an index indicating a communication success rate with one of the different wireless communication devices based on an electric wave received by the wireless receiver from the one of the different wireless communication devices;
update a metrics value, which corresponds to the one of the different wireless communication devices transmitting the electric wave received by the wireless receiver, into a metrics value calculated based on the electric wave received by the wireless receiver in a metrics table in which metrics values are associated with the respective different wireless communication devices, based on that the metrics value is calculated based on the electric wave received by the wireless receiver;
determine a metrics count indicating how many metrics values in the metrics table are within a fulfilled communication range indicating a communication success rate being high when the wireless receiver receives a transfer target data;
transmit the transfer target data from the wireless transmitter in response to the metrics count being within a predetermined transfer performable range;
not transmit the transfer target data from the wireless transmitter in response to the metrics count being outside of the transfer performable range,
wherein the transfer target data is one of a plurality of transfer target data that are different mutually, and wherein the control circuit is further configured to
store, in a storage, data-identifying information that identifies the transfer target data transmitted from the wireless transmitter;
determine whether the transfer target data received by the wireless receiver is to be transmitted from the wireless transmitter based on whether the data-identifying information corresponding to the transfer target data received by the wireless receiver is stored in the storage;
update a pre-total metrics value that is attached to other transfer target data from the different wireless communication device and received by the wireless receiver based on the metrics value in the metrics table and the pre-total metrics value received by the wireless receiver, the pre-total metrics value being a value estimating a total of the metrics values relative to a data transfer route through which the other transfer target data passes to reach the wireless communication device from when the other transfer target data was transferred to, and reaches the wireless communication device; and
store the pre-total metrics value updated by the pre-total metrics update section in the storage to be associated with the data-identifying information, each time the transfer target data is transmitted from the wireless transmitter, wherein
in cases that the data-identifying information corresponding to the transfer target data received by the wireless receiver is stored in the storage, the transfer target data is transmitted from the wireless transmitter in response to the updated pre-total metrics value being a value indicating the communication success rate and being higher than a value of the pre-total metrics value stored in the storage before the pre-total metrics value is updated.

7. The wireless communication device according to claim 6, wherein
the control circuit is further configured to update the pre-total metrics value received by the wireless receiver based on (i) the pre-total metrics value received by the wireless receiver and (ii) the metrics value that indicates the communication success rate being lowest among the metrics values that are included in the metrics table and within the fulfilled communication range.

8. The wireless communication device according to claim 6, wherein
in cases that a hop count attached to the other transfer target data from the different wireless communication device is received by the wireless receiver along with the transfer target data, and the transfer target data is transmitted from the wireless transmitter, the control circuit is further configured to
update the hop count received by the wireless receiver and
store the updated hop count in the storage to be associated with the data-identifying information, the hop count indicating how many times the other transfer target data transferred from the different wireless communication device is transferred, wherein
in cases that the data-identifying information corresponding to the transfer target data received by the wireless receiver is stored in the storage, the transfer target data from the wireless transmitter is transmitted in response to the hop count updated by the control circuit being smaller than the hop count stored in the storage before the hop count is updated.

9. The wireless communication device according to claim 6, wherein the transfer performable range is assigned with a lower limit value being equal to or greater than two.

10. The wireless communication device according to claim 6, wherein the transfer performable range is assigned with an upper limit value.

11. The wireless communication device according to claim 6, wherein
in cases that the data-identifying information corresponding to the transfer target data received by the wireless receiver is stored in the storage, the control circuit is further configured to not transmit the transfer target data from the wireless transmitter; and
in cases that the data-identifying information corresponding to the transfer target data received by the wireless receiver is not stored in the storage, the control circuit is further configured to transmit the transfer target data from the wireless transmitter.

12. The wireless communication device according to claim 6, wherein
the wireless communication device and the different wireless communication devices are used in respective vehicles that are mutually different;
when the wireless receiver receives the other transfer target data from the different wireless communication device, the control circuit is further configured to determine whether the different wireless communication device is present ahead of the wireless communication device and in a heading direction of the wireless communication device; and
when the control circuit determines that the different wireless communication device is not present ahead of the wireless communication device and in the heading direction of the wireless communication device, the control circuit is further configured to not transmit the transfer target data from the wireless transmitter.

13. A wireless communication device including a wireless receiver receiving a transfer target data and a wireless transmitter transmitting the transfer target data received by the wireless receiver, the wireless communication device communicating with a plurality of different wireless communication devices identical to the wireless communication device in function, the wireless communication device comprising:

a control circuit including a processor, the control circuit configured to
successively calculate a metrics value that is an index indicating a communication success rate with one of the different wireless communication devices based on an electric wave received by the wireless receiver from the one of the different wireless communication devices;
update a metrics value, which corresponds to the one of the different wireless communication devices transmitting the electric wave received by the wireless receiver, into a metrics value calculated based on the electric wave received by the wireless receiver in a metrics table in which metrics values are associated with the respective different wireless communication devices, based on that the metrics value is calculated based on the received electric wave;
determine a metrics count indicating how many metrics values in the metrics table are within a fulfilled communication range indicating a communication success rate being high when the wireless receiver receives a transfer target data;
transmit the transfer target data from the wireless transmitter in a broadcast mode in response to the metrics count being within a predetermined transfer performable range; and
not transmit the transfer target data from the wireless transmitter in response to the metrics count being outside of the transfer performable range, wherein
the transfer performable range is assigned with an upper limit value, and
the control circuit is further configured to calculate the metrics value using at least one of (i) a distance between the wireless communication and the different wireless communication device, (ii) a last reception time of an electric wave received from the different wireless communication device, and (iii) a strength of the electric wave received from the different wireless communication device.

14. The wireless communication device according to claim 13, wherein
the control circuit is further configured to calculate the metrics value using the last reception time of the electric wave received from the different wireless communication device.

* * * * *